April 8, 1947.   A. S. THOMPSON   2,418,488
POWER PLANT APPARATUS
Filed July 29, 1944
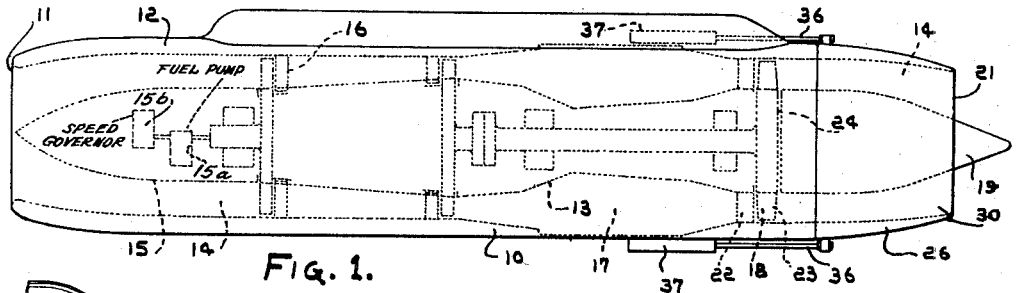
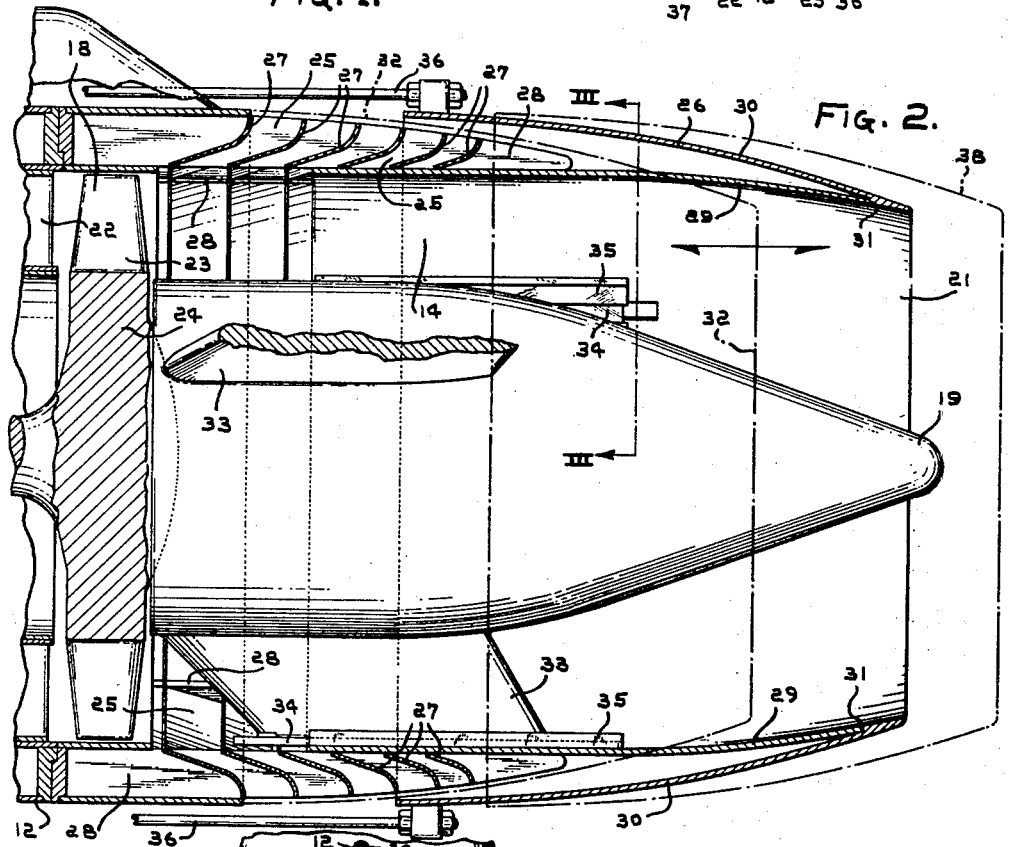
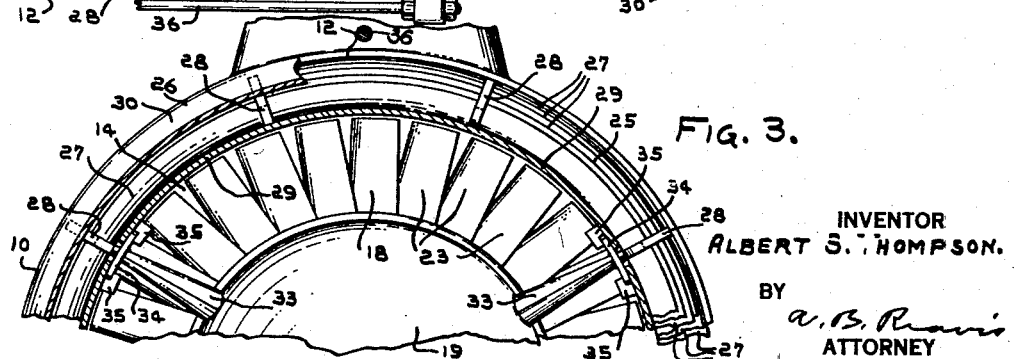
INVENTOR
ALBERT S. THOMPSON.
BY
ATTORNEY Patented Apr. 8, 1947

2,418,488

UNITED STATES PATENT OFFICE 2,418,488

POWER-PLANT APPARATUS

Albert S. Thompson, Swarthmore, Pa., assignor to Westinghouse Electric Corporation, East Pittsburgh, Pa., a corporation of Pennsylvania Application July 29, 1944, Serial No. 547,256

8 Claims. (Cl. 60—35.6)

This invention relates to power plants of the gas turbine type and it has for an object to provide improved means for regulating the jet of motive fluid discharged from the plant.

In the application of Stewart Way, Serial No. 482,533, filed April 10, 1943, and assigned to the assignee of the present invention, there is disclosed and claimed a type of power plant which has a relatively small maximum diameter and which is constructed and arranged to provide minimum drag when used for aircraft propulsion. In the power plant shown in the Way application, the plant is arranged so that the jet issuing therefrom is utilized to propel the aircraft. In accordance with my invention, I provide improved means for regulating this jet to control the back pressure on the turbine and to vary the velocity of the jet without materially changing the rotative speed of the turbine.

To facilitate landing of aircraft, provision should be made for rapid and substantial reduction in thrust. Further, assuming operation of the apparatus for this purpose, it should be capable of being operated rapidly to increase the thrust for acceleration without involving excessive temperatures. These operations are provided for by passageway means defining a jet nozzle together with diffuser nozzles which may be opened or closed. As the diffuser nozzles are progressively opened, the exit area of the passageway means is increased in relation to its inlet area defined by the turbine exhaust area; and, as discharge is to the atmosphere, the increased expansion ratio brings about reduction in pressure at the inlet, or reduction in back pressure on the turbine, with the result that the pressure drop in the jet nozzle is reduced to reduce the thrust. More particularly, the wall structure bounding the jet nozzle passage has a series of vanes forming the diffuser nozzle passages whose annular inlets are arranged to open to the inlet region of the jet nozzle passage and such structure includes a wall element or elements movable axially to open and close the diffuser nozzle passages. This arrangement has the advantage that it may be operated over the full thrust range without change in speed other than that required by the regulation of the governor. When the diffuser ports are opened, the resulting reduction in back pressure on the turbine tends to cause the latter to speed up, in consequence of which the governor operates to diminish the fuel supply rate to thereby limit the speed. On the other hand, when the diffuser ports are closed, the increase in back pressure for the turbine tends to slow the latter down, causing operation of the governor to increase the fuel rate to a point where the machine operates at designed speed, at maximum safe temperature and at maximum thrust. Therefore, the plant may be operated continuously at the maximum or predetermined speed fixed by the governor and the thrust varied through its entire range from minimum to maximum without retarding or accelerating the engine, the only speed change being the small percentage or deviation required for operation of the governor. Furthermore, the apparatus providing for reduction in back pressure makes starting easier for the reason that, to start, the turbine back pressure may be reduced to a minimum with the result that the turbine is effective to initiate starting at a lower rotative speed and a lower maximum temperature, and faster acceleration of the unit may be had. Also, the structure by which the diffuser passages are opened and closed provides a boundary wall for the jet nozzle passage effective to provide for high efficiency at full thrust load. Accordingly, a further object of the invention is to provide a plant of this character having these advantageous features of construction and of operation.

A further object of my invention is to provide a gas turbine power plant having improved means for regulating the pressure existing at the gas turbine exhaust and at the inlet of the propulsion jet nozzle.

A more particular object of the invention is to provide for reduction in thrust of a jet nozzle of the above character by means of an annular formation of diffuser nozzles opening to the inlet region of the jet nozzle and discharging circumferentially so that the diffuser nozzles may be opened and closed by wall structure of the jet nozzle with the result that design of the jet nozzle passage for best efficiency is not adversely affected.

A further object of the invention is to provide apparatus of the above character wherein the diffuser nozzles for reducing the back pressure are arranged to discharge circumferentially to avoid unbalanced lateral thrust combining with the jet thrust to give a direction of thrust effort which is different from that of the jet nozzle alone.

These and other objects are effected by the invention as will be apparent from the following description and claims taken in connection with the accompanying drawings, forming a part of this application, in which:

Fig. 1 is a side elevational view of a power plant in which the present invention is incorporated;

Fig. 2 is an enlarged vertical sectional view of the after end of the power plant shown in Fig. 1; and Fig. 3 is a view taken substantially on the line III—III of Fig. 2.

The power plant shown in Fig. 1, generally indicated at 10, is adapted to be mounted in or on the fuselage or wings of airplanes with the left, or intake 11, as viewed in this figure, pointed in the direction of flight. The power plant comprises an outer shell or casing structure 12, which, together with an inner core structure indicated generally at 13, provides an annular air duct 14 extending through the casing structure fore and aft with repect to the airplane. The core structure 13 is coaxial with and supported by the casing structure and comprises a nose portion 15 in which a fuel pump and a governor, indicated at 15a and 15b, respectively, and lubricating oil pump and ignition apparatus (not shown) may be supported. The core structure further includes an axial-flow compressor 16, combustion apparatus contained in the annular space 17, a turbine 18, and a tailpiece 19, which, together with the rear of the casing 12, defines a propulsion or discharge nozzle 21.

The operation of the power plant is generally as follows: Air enters at the intake 11, and flows through the compressor 16 where it is compressed and into the combustion apparatus 17, which may be of any suitable construction and arranged to add heat to the compressed air supplied by the compressor. The combustion apparatus may be like that shown in said Way application and comprise one or more burner tubes in which the compressed air is mixed with fuel, the mixture being burned providing a hot motive fluid comprising the products of combustion and excess air. The hot motive fluid on leaving the combustion apparatus is directed by suitable guide vanes 22 against moving blades 23 of the rotor 24 of the turbine 18. The residual energy available in the motive fluid leaving the turbine blades provides for discharge of such fluid through the nozzle 21 as a jet to propel or aid in propelling the airplane.

In starting the power plant, for example, it is desirable that the back pressure on the turbine 18 be at a minimum, and, therefore, means are provided in the form of radially-extending diffusing passages, generally indicated at 25, which may be progressively opened to provide minimum restriction to the discharge of hot motive fluid from the turbine to the atmosphere. However, when the power plant is up to speed as when the aircraft is ready to take off, it is desirable to obtain a maximum jet effect by exhausting all of the motive fluid through the nozzle 21 in which case the diffusing passages 25 are all closed. Further, during flight, it may be desired to vary the velocity of the fluid being exhausted through the propulsion nozzle in order to change the jet effect thereof. These conditions are obtained by mounting a sleeve 26 for longitudinal movement along the longitudinal axis of the plant so that the passages 25 may be progressively covered and uncovered.

The diffusing passages 25 are disposed immediately to the rear of the turbine rotor 24 and are formed by a plurality of suitably-shaped, spaced, annular vane members 27 supported by means of circumferentially-spaced ribs 28 which are in turn fixed to the casing structure 12 at their forward ends. The inlet edges of the vanes 27 are disposed so as to define a suitable small angle relative to the flow passage so that fluid may be easily deflected from the latter and gradually turned outward to the extent fixed by the vane curved section.

The sleeve member 26 comprises inner and outer concentric tubular members 29 and 30, respectively, which are joined at their rearward ends, as indicated at 31. The inner tubular member 29 is of a size to be freely slidable along the inlet edges of the vanes 27 while the outer member 30 is shaped so that when it is disposed in its forward position, as indicated by the broken line 32 in Fig. 2, it is disposed adjacent the outlet edges of the vanes 27 and forms a continuation of the streamlined outer casing structure 12, as shown particularly in Fig. 1.

The sleeve structure 26 is slidably supported for axial movement with respect to the power plant by means of struts 33 carried by the fixed tailpiece 19 and which are provided at their outer ends with guide strips 34. The guide strips 34 engage the inner surface of the tubular member 29 and fit channel members or tracks 35 fixed to the member 29 so as to guide the sleeve structure longitudinally with respect to the power plant.

The sleeve structure 26 is adapted to be shifted longitudinally of the power plant by any suitable means as, for example, by means of rods 36 each having one end fixed at diametrically-opposed points, to the outer tubular member 30. In the embodiment shown, the other end of each rod is connected to suitable hydraulic or mechanical means, shown schematically at 37 in Fig. 1, for shifting the sleeve under the control of the pilot.

The sleeve structure 26 is shiftable from its closed position, represented by the broken line 32, to its fully open position, represented by the broken line 38, and is preferably positionable at any point between the limits represented by the broken lines 32 and 38.

It will be appreciated that with the sleeve structure 26 disposed in its closed position so that the diffusing passages 25 are closed, all of the motive fluid exhausting from the turbine is discharged through the propulsion nozzle 21 to obtain the maximum jet effect. Further, the sleeve structure tapers toward its rear end so that, in its closed position, it provides a minimum flow area for the exhaust of motive fluid through the propulsion nozzle to provide the maximum jet effect because of increased velocity incident to reduction in area. When the sleeve structure 26 is shifted to its full open position to uncover all of the diffusing passages, much of the motive fluid is diverted through the diffusing passages and, therefore, reduces the velocity of the motive fluid issuing from the propulsion nozzle, thereby reducing the jet effect or thrust of the power plant. Further, in its fully open position, that is, with the sleeve structure 26 in the position represented by the broken line 38, the nozzle 21 has a substantially greater flow area than when the sleeve structure is fully closed, thereby further diminishing the velocity of the jet issuing through the nozzle.

With the diffuser nozzle inlets completely closed, the ratio of exit area to inlet area of the nozzle passageway means is a minimum, that is, the ratio of the exit area of the passage 21 to the inlet area may be of the order of unity or slightly less. As the diffuser nozzles are progressively opened, the exit area of the passageway means is increased in relation to the inlet area thereof; and, as exit from the passageway means is to atmosphere, it will be apparent that increase in exit area has the effect of reducing the pressure at the discharge side of the turbine. The exit area effective for this purpose comprises the exit area of the passage 21 and the circumferential exit area or areas of diffuser nozzle passage or passages 25. Therefore, the total exit area may be increased to increase its ratio from unity or slightly less existing with the diffuser nozzles all closed and the exit area defined entirely by that of the jet nozzle to around three with the diffuser nozzles open and their exit areas adding to the jet exit area.

With the present invention, the jet effect or thrust exerted by the motive fluid discharging through the nozzle 21 may be varied as rapidly as the sleeve structure can be moved in and out, and shifting of this member to vary the thrust is obtained without materially changing the rotative speed of the turbine. As the diffuser nozzle passages 25 are opened, the consequent reduction in back pressure on the turbine results in tendency of the latter to increase in speed to operate the speed governor 15b to reduce the rate at which fuel is being supplied to limit the increase in speed. On the other hand, closing of the diffuser nozzles and consequently increasing the back pressure for the turbine results in operation of the governor to increase the fuel rate. Thus, by opening and closing the diffuser nozzles, the thrust may be varied through its full range with the plant running at the predetermined speed fixed by the governor speed and without safe operating temperatures being exceeded, the plant operating at designed speed, maximum safe temperature and maximum thrust with the diffuser nozzles closed. Furthermore, reduction in back pressure makes starting easier.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. A tailpiece assembly for power plants including a turbine comprising a wall structure providing a flow passage and discharge nozzle for motive fluid driving said plant, said wall structure including a fixed tubular portion and a movable tubular portion coaxial therewith, means for shifting said movable tubular portion longitudinally with respect to said fixed portion, and diffuser nozzles disposed downstream of said turbine and fixed tubular portion, said nozzles communicating with said flow passage and opening radially outward to the atmosphere and diverging outwardly from said flow passage, said movable tubular portion being arranged to substantially close said diffuser nozzles and shiftable to uncover one or more of said nozzles.

2. In a gas turbine power plant comprising a tubular casing structure and a central core structure supported therein defining an annular flow passage and including a gas turbine driven by motive fluid flowing through said annular flow passage, an adjustable tailpiece assembly aligned with said casing structure and providing a discharge nozzle for said motive fluid, said tailpiece assembly including a tubular wall structure coaxial with and movable relative to said casing structure and providing a discharge nozzle for motive fluid flowing through said flow passage, and one or more diffuser nozzles arranged downstream of said turbine and opening into said flow passage and communicating at their discharge ends with the atmosphere, said movable tubular structure being arranged to cover said nozzles and shiftable to uncover one or more of said nozzles.

3. A power plant like that set forth in claim 2 in which said divergent nozzles have an area ratio between the outlet and inlet thereof of the order of three to one.

4. A power plant like that set forth in claim 2 in which said divergent nozzles are comprised by annular divergent passages defined by coaxial annular vanes arranged coaxially with respect to said casing structure.

5. A power plant like that set forth in claim 2 in which said divergent nozzles are comprised by annular divergent passages defined by coaxial annular vanes arranged coaxially with respect to said casing structure and wherein the ratio of exit area to inlet area of each passage is of the order of three to one.

6. In a gas turbine power plant, inner and outer structures providing an annular flow passage, a turbine including blading arranged in the flow passage, said outer structure including a tailpiece portion cooperating with the inner structure to define a jet passage for motive fluid exhausting from the turbine, means for moving the tailpiece portion axially to change the expansion ratio of the jet passage, an annular nozzle structure carried by said outer structure and including a plurality of spaced annular vanes defining annular nozzle passages, and means carried by the tailpiece for progressively opening and closing the annular nozzle passages as the tailpiece is moved axially in opposite directions.

7. Apparatus according to claim 6 wherein the tailpiece portion includes inner and outer tubular elements arranged to cover the vanes and the nozzle passages defined by the latter when such portion is in its forward position and to progressively uncover such passages as it is moved rearwardly.

8. In a gas turbine power plant, inner and outer structures providing an annular flow passage, a turbine including blading arranged in the flow passage, said outer structure including a tailpiece portion cooperating with the inner structure to define a jet passage for motive fluid exhausting from the turbine, means for moving the tailpiece portion axially to change the expansion ratio of the jet passage, and an annular nozzle structure carried by said outer structure adjacent to the exhaust side of the turbine and including a plurality of spaced annular vanes defining annular nozzle passages, said tailpiece including a sleeve slidably engaging the inner edges of the annular vanes so that the annular nozzle passages may be opened and closed thereby as the tailpiece is moved axially in opposite directions.

ALBERT S. THOMPSON.

REFERENCES CITED

The following references are of record in the file of this patent:

UNITED STATES PATENTS

| Number | Name | Date |
|---|---|---|
| 2,280,835 | Lysholm | Apr. 28, 1942 |